Figure 1:
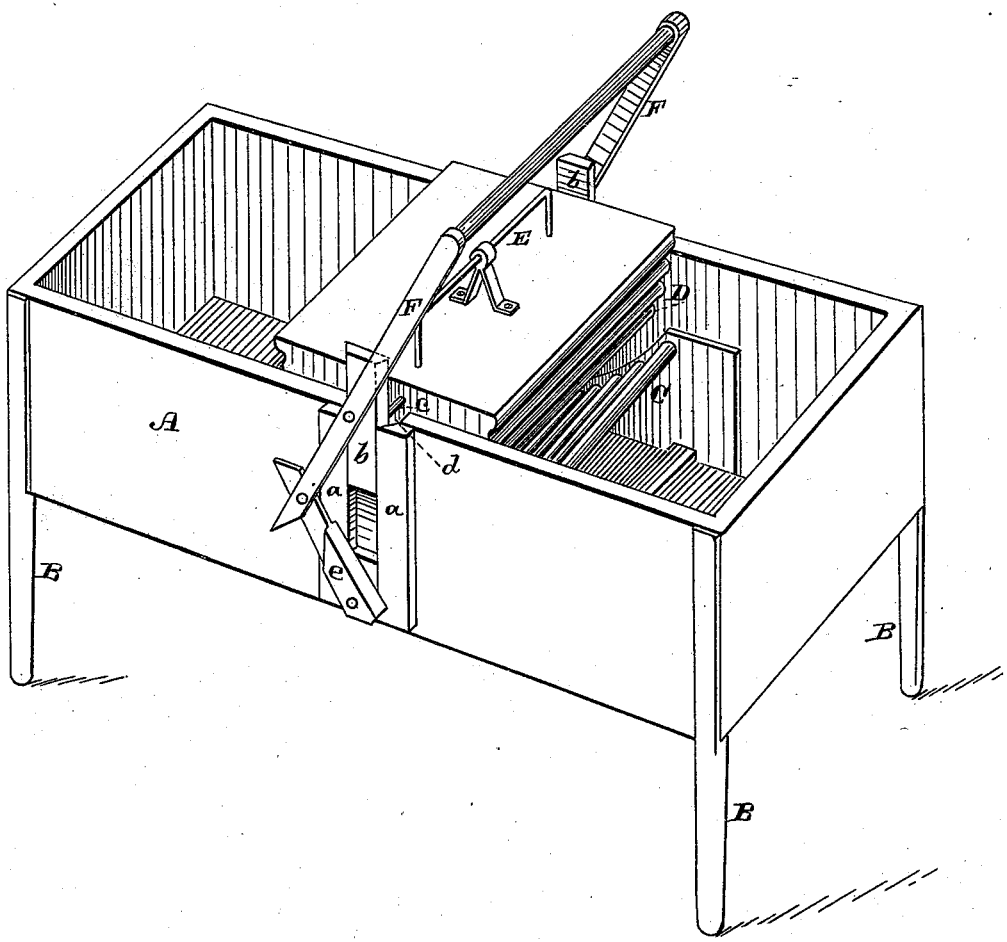

(No Model.)

W. A. HEDGER.
WASHING MACHINE.

No. 273,359. Patented Mar. 6, 1883.

Witnesses:
Geo. H. Strong
J. H. Krouse

Inventor,
Wm. A. Hedger
By Dewey & Co.
Attorney

UNITED STATES PATENT OFFICE.

WILLIAM A. HEDGER, OF WHEATLAND, CALIFORNIA.

WASHING-MACHINE.

SPECIFICATION forming part of Letters Patent No. 273,359, dated March 6, 1883.

Application filed January 2, 1883. (No model.)

*To all whom it may concern:*

Be it known that I, WILLIAM ARTHUR HEDGER, of Wheatland, county of Yuba, State of California, have invented an Improved Washing-Machine; and I hereby declare the following to be a full, clear, and exact description thereof.

My invention relates to the class of washing-machines, and more particularly to those in which a hemispherical rubber is caused to oscillate in a concave board.

My invention consists in a novel means for elevating and depressing the rubber to allow the insertion of the clothes and to press them down to their places, as will hereinafter be fully described.

The object of my invention is to overcome that difficulty which is known to exist in introducing the clothes under a rubber which operates in a confined space and remains close to its board; and, further, to provide a means for easily adjusting the position of the rubber after the clothes are inserted.

Referring to the accompanying drawing, the figure is a perspective view of my invention.

Let A represent the basin, suitably mounted on legs B. In the sides of the basin are mounted a number of independent rollers, forming the wash-board C. These rollers are arranged in the bottom of the basin, near its center, in a concave shape, as shown.

D is a hemispherical rubber, the periphery of which is fluted or corrugated. This rubber is adapted to oscillate over and against the board C, the clothes lying between them. E is a handle by which it is oscillated.

In order to introduce the clothes, when a considerable number have to be put in, it becomes necessary to remove the rubber from the board. From the nature of the case, as it cannot be turned or drawn away, it must be elevated, and to do this simply by hand is inconvenient. To obviate this I have the following construction: Upon the sides of the machine are beveled guides $a$, in which strips $b$ are adapted to move vertically. The ends of the shaft $c$, upon which the rubber D is secured, are mounted in these sliding strips $b$, and by their movement the rubber may move up and down and be adjusted. Slots $d$ are cut in the sides of the basin to allow this vertical movement of the shaft.

In order to operate the sliding strips, I have the short levers $e$, pivoted on each side, near the bottom of the basin. To the top of these are pivoted the ends of a bail or handle, F, to which the sliding strips $b$ are also pivoted. Now, by moving the handle F to a vertical position the sliding strips $b$ move up, and by moving the handle back again they are depressed. It requires little power to operate the handle, and the rubber may thus be adjusted vertically with ease, and may be stopped at any point desired. By pulling down on the handle at the same time that the rubber is being oscillated as much friction may be obtained as desired. The rubber may be raised high enough to allow the clothes to be introduced, and then lowered to the desired point.

The device is simple, economical, and effective.

Having thus described my invention, what I claim as new, and desire to secure by Letters Patent, is—

1. In a washing-machine, the concave wash-board C and hemispherical rubber D, adapted to be oscillated in said board, in combination with the sliding strips $b$, in which said rubber is mounted, the levers $e$, and bail or handle F, pivoted thereto, for raising and depressing the rubber, all arranged and operating substantially as herein described.

2. In a washing-machine, a rubbing device and the sliding strips $b$, to which said rubbing device is attached, in combination with the levers $e$, and the bail or handle F, pivoted thereto, for raising and depressing the rubber, arranged and operating substantially as and for the purpose herein described.

In witness whereof I hereunto set my hand.

WILLIAM ARTHUR HEDGER.

Witnesses:
JAMES R. BERRY,
THOMAS RANKIN HARRIS.